United States Patent
Mathur et al.

(10) Patent No.: US 9,621,964 B2
(45) Date of Patent: Apr. 11, 2017

(54) ABORTING DATA STREAM USING A LOCATION VALUE

(71) Applicant: Oracle International Corporation, Redwood City, CA (US)

(72) Inventors: Bhaskar Mathur, Bangalore (IN); Feroz Alam Khan, Bangalore (IN); Kant C. Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 676 days.

(21) Appl. No.: 13/632,139

(22) Filed: Sep. 30, 2012

(65) Prior Publication Data

US 2014/0095665 A1  Apr. 3, 2014

(51) Int. Cl.
| | | |
|---|---|---|
| G06F 15/16 | (2006.01) | |
| H04N 21/845 | (2011.01) | |
| H04N 21/44 | (2011.01) | |
| H04N 21/6332 | (2011.01) | |
| H04L 1/00 | (2006.01) | |

(52) U.S. Cl.
CPC ... *H04N 21/8455* (2013.01); *H04N 21/44008* (2013.01); *H04N 21/6332* (2013.01)

(58) Field of Classification Search
CPC ......... H04N 21/44008; H04N 21/8455; H04N 21/6332
USPC .................. 709/203, 219, 227, 232; 370/216
See application file for complete search history.

(56) References Cited

U.S. PATENT DOCUMENTS

| | | | |
|---|---|---|---|
| 6,396,805 B2* | 5/2002 | Romrell | H04L 67/06 370/216 |
| 6,526,447 B1* | 2/2003 | Giammaria | G06F 11/1471 709/224 |
| 6,588,011 B1* | 7/2003 | Giammaria | G06F 8/61 714/E11.135 |
| 6,591,302 B2 | 7/2003 | Boucher et al. | |
| 6,615,274 B1* | 9/2003 | Achtermann | H04L 12/18 709/203 |
| 6,772,158 B1* | 8/2004 | Giammaria | H04L 29/06 |
| 6,912,586 B1* | 6/2005 | Achtermann | H04L 67/06 370/226 |
| 7,337,241 B2 | 2/2008 | Boucher et al. | |
| 7,418,506 B1* | 8/2008 | Achtermann | G06F 9/5055 709/222 |
| 7,587,294 B2 | 9/2009 | Cheong | |

(Continued)

*Primary Examiner* — David Lazaro
*Assistant Examiner* — Vitali Korobov
(74) *Attorney, Agent, or Firm* — Meyertons, Hood, Kivlin, Kowert & Goetzel, P.C.

(57) ABSTRACT

Techniques and systems that allow receiving a data stream and a location value. The location value, in one embodiment, is indicative of a location in the data stream at which the data stream has been aborted. This value may be determined by a sending entity and sent to a receiving entity. In various embodiments, the receiving entity may compute the remaining amount of data to be received in the data stream, and then receive that amount of data. In some embodiments, a checkpoint value may be used in conjunction with the location value to indicate an abort location for a data stream. A checkpoint value may correspond to an amount of data between successive checkpoints in the data stream. In some embodiments, upon aborting a data stream, a receiving entity receives data until a next checkpoint in the data stream.

14 Claims, 14 Drawing Sheets

(56) References Cited

U.S. PATENT DOCUMENTS

| | | | |
|---|---|---|---|
| 2004/0190092 A1* | 9/2004 | Silverbrook | G06F 3/0317 358/539 |
| 2007/0112962 A1 | 5/2007 | Lewontin | |
| 2008/0224903 A1* | 9/2008 | Samuels | H03M 7/3084 341/51 |
| 2008/0228933 A1* | 9/2008 | Plamondon | H04L 69/04 709/230 |
| 2009/0024875 A1 | 1/2009 | Cheong | |

* cited by examiner

ABORTING DATA STREAM USING A LOCATION VALUE

BACKGROUND

Technical Field

This disclosure relates to computer networking, and more specifically to aborting a data stream.

Description of the Related Art

In many instances, the field of computer networking relies on communications between entities that can be respectively referred to an origin and a destination. As just one example, an origin may be a server and a destination may be a client device. The data communicated between an origin and destination may be referred to as a data stream. Communication of a data stream may, in some instances, utilize various communication protocols such as Transport Control Protocol (TCP). The use of TCP may allow an origin and a destination to communicate as if no barrier exists between respective software applications on the two entities.

At various times, however, an origin may desire to cause communication of a data stream to be aborted. In one embodiment, aborting of a data stream may be caused when a software application receives an abort indication from a process or a user of that application. For example, a user of a WINDOWS® platform might produce an abort indication using a keystroke (e.g., Ctrl+C). An abort indication might also be produced by a software application error. In some embodiments, TCP out-of-band (OOB) data received at a destination may indicate to an Application Programming Interface (API) or software application that a data stream has been aborted. But some inefficiencies exist with this approach, such as when the OOB data is removed from the data stream. In these instances, the aborted data stream may undesirably continue to be received and read by the destination.

SUMMARY

In one embodiment, a method is disclosed in which a destination device receives a data stream from an origin; the data stream includes a location value that indicates a location in the data stream at which the origin has aborted communication of the data stream. (In one embodiment, the origin may be a first software application executing on an origin device distinct from the destination device; in another embodiment, the origin may be a first software application executing on the destination device.) The method further includes the destination device determining a remaining amount of data to be received from the data stream, in which the determining is based at least in part on the location value. In some embodiments, determining the remaining amount of data to be received from the data stream is further based on a checkpoint value that identifies an amount of data between successive checkpoints in the data stream.

In some embodiments, the destination device determining the remaining amount of data to be received from the data stream includes determining that the data stream includes a pointer to the location value, and retrieving the location value using the pointer. Determining the remaining amount of data to be received from the data stream may also include the destination device determining an amount of data that has been received from the data stream, and determining the remaining amount of the data stream to be received from the data stream based at least in part on the location value and the amount of data that has been received. After determining the remaining amount of data from the data stream, the destination device may use the location value to identify a beginning of a different data stream.

In another embodiment, a non-transitory computer-readable storage medium is disclosed that stores instructions that are executable by a computing device to perform operations that include receiving a data stream, receiving a location value indicative of a location in the data stream at which communication of the data stream has been aborted, and using the location value to determine a remaining amount of data to be received from the data stream. In some embodiments, the data stream that is received may include a length value, which may identify an amount of data in the data stream. The operations that may be performed by execution of the instructions may further include, in some embodiments, in response to the receiving of the location value, using the location value to begin reading a different data stream. In some embodiments, the location value corresponds to out-of-band data.

In still another embodiment, a non-transitory computer-readable storage medium is disclosed that stores instructions that are executable by a computing device to perform operations that include determining a checkpoint value for a data stream to be sent to a destination, in which the checkpoint value corresponds to an amount of data between successive checkpoints in the data stream. The operations may further include sending the data stream to the destination, where the data stream includes the determined checkpoint value; determining a location value indicative of a location within the data stream at which sending of the data stream was aborted; and sending the location value to the destination, where the checkpoint value and the location value are usable by the destination to determine a remaining amount of the data stream to be received. In certain embodiments, the determining of the checkpoint value occurs at an application layer, and the determining of the location value occurs at a lower-level layer relative to the application layer.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components described herein may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 1:
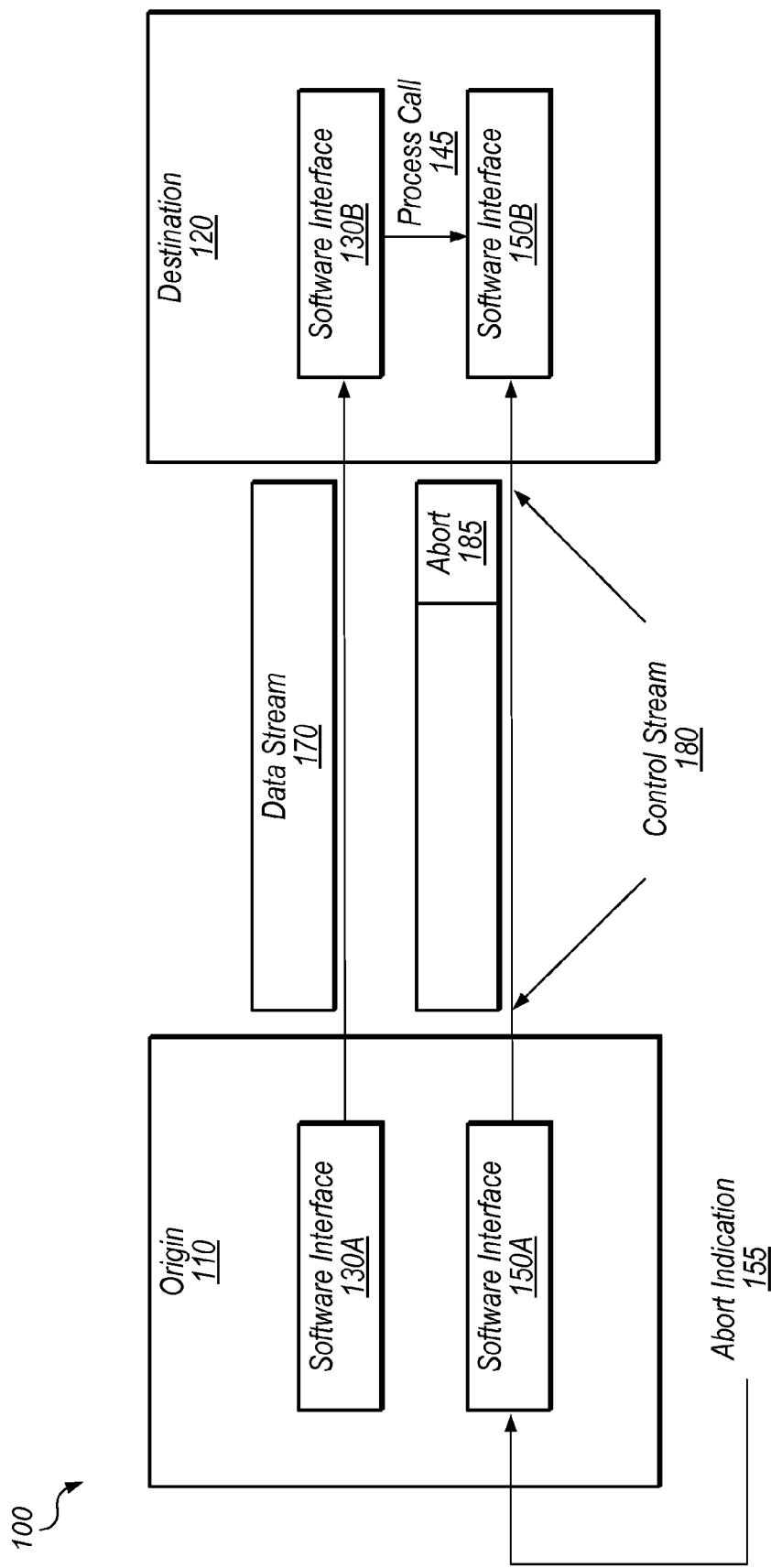
FIG. 1 is a block diagram illustrating one embodiment of a communication system.

Turning now to FIG. 1, a block diagram illustrating one embodiment of a communication system 100 is shown. As depicted, system 100 includes origin 110 and destination 120. In various embodiments, origin 110 and destination 120 may be software or hardware entities. Origin 110 is one example of a "sending entity," and destination 120 is one example of a "receiving entity." Phrases such as "origin device" and "destination device" are used to refer to hardware entities. In the embodiment shown, origin 110 sends a data stream 170 to destination 120 via software interfaces 130A and 130B. Origin 110 also sends control stream 180 to the destination via software interfaces 150A and 150B. In the embodiment shown, control stream 180 is used by origin 110 to communicate information to destination 120 regarding data stream 170. In one software embodiment, the control stream allows origin 110 to provide commands to destination 120 regarding data stream 170, for example, in a file transfer protocol (FTP) session. In one mobile communication embodiment, the control stream provides information about how to distribute information in data stream 170 among different requests from mobile devices pending on destination 120.

Thus, in the embodiment shown in FIG. 1, data stream 170 and control stream 180 are communicated via different software interfaces. Accordingly, when origin 110 needs to communicate certain types of control information to destination 120 regarding data stream 170, such information is sent via software interfaces 150 and control stream 180. For example, software interface 150A may receive an abort indication 155 indicating that the transmission of data stream 170 to destination 120 should be discontinued. (Abort indication 155 may be initiated in various embodiments by a user of origin 110, a process executing on origin 110, etc. For example, an error by a process executing on origin 110 may produce an abort indication 155). In such an instance, this information may be sent via control stream 180. The communication of this information is illustrated in FIG. 1 as abort value 185.

In the illustrated embodiment, destination 120, on the other hand, receives data stream 170 and control stream 180 via software interfaces 130B and 150B, respectively. Because data and control streams 170 and 180 are handled by different software interfaces, destination 120 may need to communicate via both interfaces 130B and 150B to ensure proper data handling. For example, in one embodiment, destination 120 may initiate a process call 145 to software interface 130B, which in turn is communicated to software interface 150B to determine if an abort value 185 has been received in the control stream. If such an abort value has been received at software interface 150B, destination 120 may choose to abort receiving data in data stream 170 via software interface 130B.

A potential disadvantage to the configuration of communication system 100 is that origin 110 and destination 120 maintain separate software interfaces for data and control streams 170 and 180. Similarly, this separation may mean that some form of communication via these interfaces is needed (e.g., process call 145). The need for such communication may cause certain difficulties. For example, such an arrangement may make implementation difficult for a pair of applications operating in conjunction within respective sending and receiving entities. An example of synchronous applications may be communication programs on either side of a communication socket. Such pairs of "synchronous" applications are typically executable to wait on the results of a process on a first set of software interfaces to finish before initiating a request via a second set of software interfaces. Accordingly, a paradigm in which a process call to another data stream is made is not easily extendible to the synchronous application paradigm. Further, adding a second set of software interfaces may undesirably add complex logic to any load-balancing module that may exist at a sending or receiving entity. For example, in one embodiment, the load balancing module has to route software interface 150A to the same process that is using software interface 130B. In another embodiment, the response to process call 145 may require routing to a different process, which is using software interface 150B.

With this framework in mind, some of the potential disadvantages of system 100 may be avoided by various systems described below, including system 200 described next with reference to FIG. 2.

Figure 2:
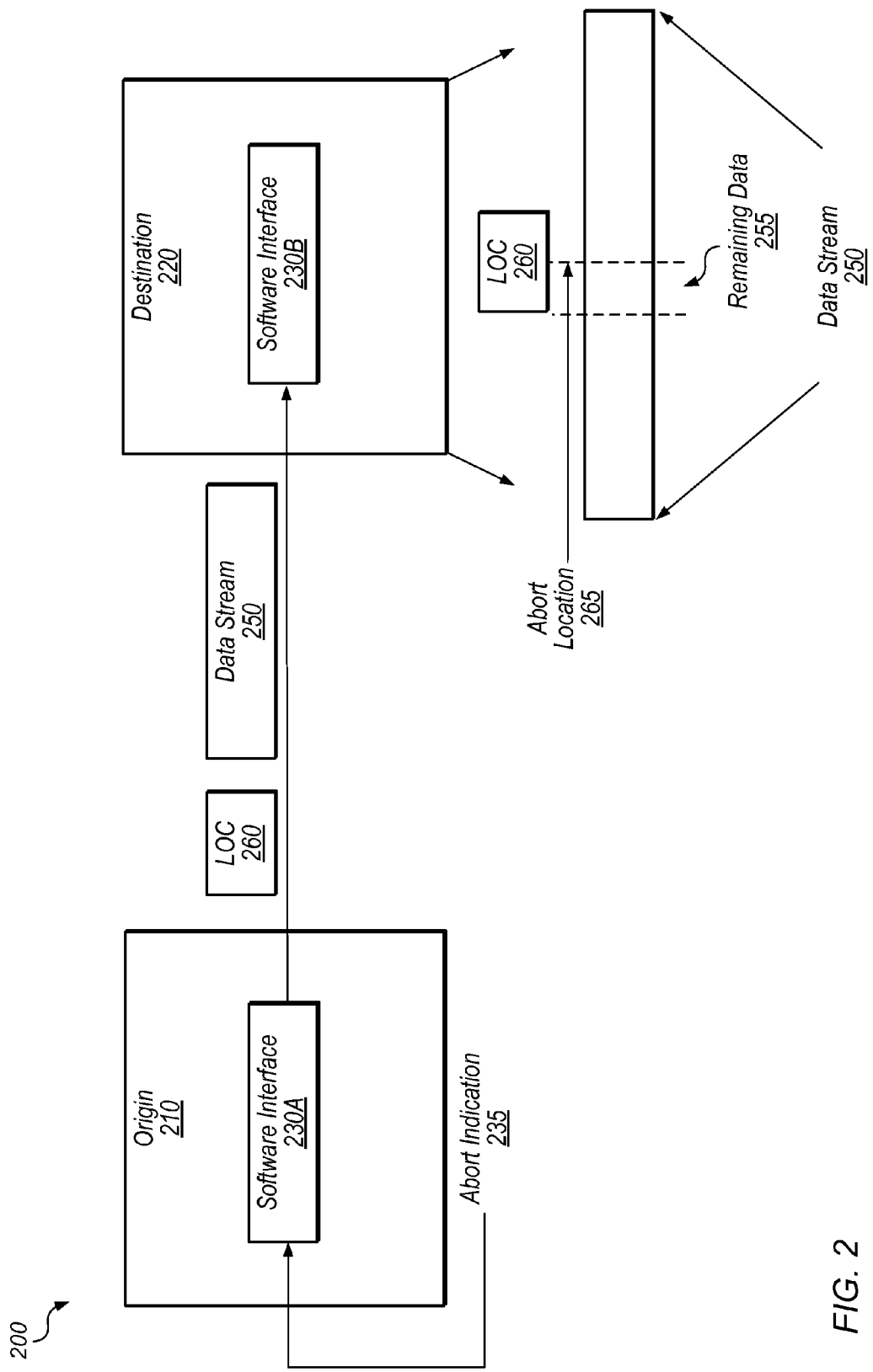
FIG. 2 is a block diagram illustrating another embodiment of a communication system.

Turning now to FIG. 2, a block diagram illustrating one embodiment of a communication system 200 is shown. As will be described in further detail below, communication system 200 may, in some implementations, avoid some of the disadvantages described above with reference to FIG. 1. As depicted, system 200 includes origin 210 and destination 220 that may communicate via data stream 250. As used herein, the term "system" is used broadly to refer to a set of one or more hardware devices. Accordingly, in one embodiment, system 200 may include a single device that includes origin 210 and destination 220 (i.e., the single device is both the sending entity and the receiving entity). In another embodiment, system 200 may include separate devices, and origin 210 and destination 220 may be included on respective ones of these separate devices (i.e., the sending and receiving entities correspond to separate entities). In various embodiments, origin 210 and destination 220 may be software (e.g., a process) or hardware (e.g., a processor) entities.

As used herein, the term "data stream" is used broadly to refer to a set of data. "Data stream" is also used broadly to refer to any data without respect to a temporal aspect. That is, data stream need not mean that data is flowing continuously; data may be transmitted finitely. For example, in various embodiments as described below, data stream 250 corresponds to the total length of a data operation that origin 210 sends to destination 220. In one embodiment, a data stream may be produced by one or more applications. In various embodiments, data stream may refer to sets of data packets transmitted in accordance with a data protocol (e.g., transport packets in Transmission Control Protocol (TCP) format). Further, as used herein, the "communication" between origin 210 and destination 220 is used broadly to refer any type of connection, including "sending" and/or "receiving" data. In various embodiments, this connection may be via a connection-oriented protocol such as TCP or X.25, a wireless connection such as 802.11, or any other suitable protocol.

In the embodiment shown, origin 210 sends a data stream 250 to destination 220 via software interfaces 230A and 230B. Non-limiting examples of these software interfaces include sockets or Application Programming Interfaces (APIs). In the illustrated embodiment, origin 210 sends data stream 250 and location value (LOC) 260 to destination 220 via software interfaces 230. Destination 220 uses location value 260 to determine abort location 265 in data stream 250 and to determine the remaining data 255 to be read in data stream 250.

In the illustrated embodiment, from the perspective of origin 210, origin 210 sends data stream 250 via software interface 230A. Origin 210 receives abort indication 235. In various embodiments, abort indication 235 may be initiated in any suitable manner, such as described above with reference to FIG. 1. For example, software interface 230A may receive an abort indication 235 indicating that the transmission of data stream 250 to destination 220 should be discontinued. In the illustrated embodiment, location value 260 is determined in response to receiving abort indication 235; value 260 is then sent to destination 220 via software interfaces 230. As used herein, the term "location value" refers to a value usable to determine a position in a data stream at which the data stream has been aborted (i.e., an abort location). The term "position in a data stream" is used broadly, and may refer to a count value within the data stream (e.g., if the location value is 200, this may specify that the stream is to be aborted after 200 bytes), a particular location within a buffer, etc. A location value may also specify a position in the data stream in other ways—for example, by specifying the number of a "checkpoint" at which the data stream has been aborted. For example, if a checkpoint in a data stream occurs every 10 bytes and a data stream is aborted after 200 bytes, the location value may be set to 20 in one embodiment. In this example, the location value is usable to determine the abort location (200 bytes), for instance by multiplying 20 by 10. Thus, in one embodiment, location value 260 is a "multiplier" that corresponds to abort location 265. The use of a checkpoint value is described further below with respect to FIGS. 3 and 9. In various embodiments, as described below, location value 260 may be included in the data stream 250.

From the perspective of destination 220, as shown in FIG. 2, destination 220 is configured to receive data stream 250 and location value 260 via software interface 230B. As illustrated, destination 220 is configured to use the location value 260 to determine abort location 265 in data stream 250. Because location value 260 also indicates to destination 220 that communication, or sending, of the data stream 250 has been aborted, destination 220 is configured to use location value 260 to determine remaining data 255 to be received or read from data stream 250. In various embodiments, as described below, destination 220 is configured to receive or read the remaining data 255. In one embodiment, a different or subsequent data stream may be received and/or read by destination 220. In some instances, the different or subsequent data stream may be read relatively quickly because data stream 250 has been aborted by destination 220.

Communication system 200 may, in some instances, allowing aborting of a data stream without using additional resources such as a control channel that may use additional software interfaces (e.g., sockets). In one embodiment, system 200 may allow data stream 250 to be aborted relatively quickly when receiving location value 260. This arrangement may mean that, in some embodiments, synchronous applications may avoid some of the inefficiencies present in system 100. That is, synchronous applications may not need to initiate a process call to another set of software interfaces because control stream 180 with abort 185 is not necessary when location value 260 is included within data stream 250. Communication system 200 may also permit origin 210 to send a relatively larger data stream 250 without requiring additional control overhead or the like within data stream 250. For example, as described above with reference to FIG. 1, data stream 170 may need to include several data packets with one or more corresponding abort values. In contrast, in one embodiment, a data stream such as data stream 250 may need to include only one location value. In this manner, communication system 200 may avoid some of the inefficiencies present in communication system 100.

Figure 3:
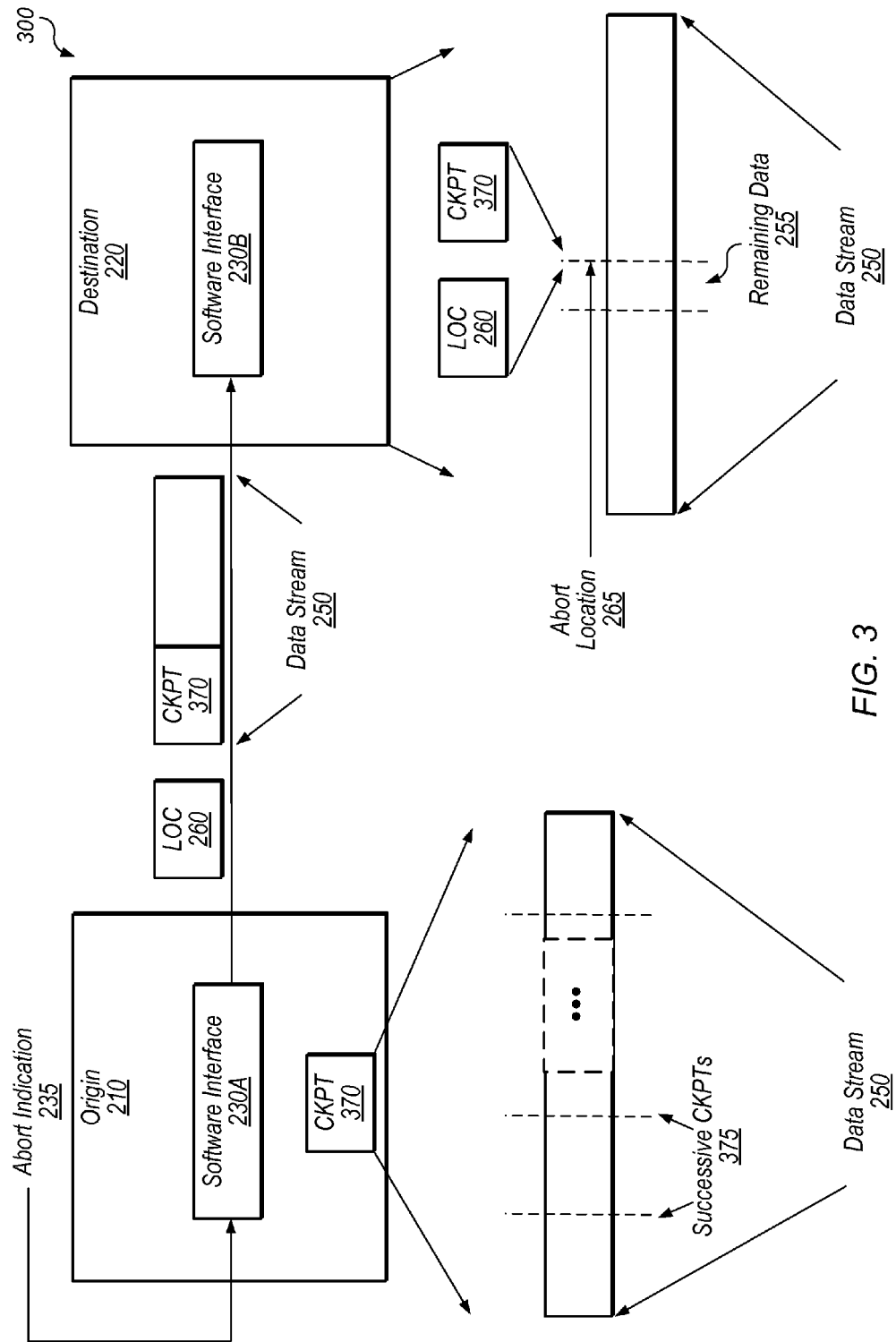
FIG. 3 is a block diagram illustrating one embodiment of a communication system that utilizes checkpoints.

Turning now to FIG. 3, a block diagram illustrating one embodiment of a communication system 300 that utilizes a checkpoint value is shown. As depicted, system 300 includes origin 210 storing a checkpoint value 370. In the embodiment shown, origin 210 sends checkpoint value 370 in data stream 250 to destination 220 via software interfaces 230. Destination 220 uses the location value 260 and checkpoint value 370 to determine abort location 265 in data stream 250 and remaining data 255 to be read. Origin 210, destination 220, software interfaces 230, data stream 250, and location value 260, all of which are similarly numbered to FIG. 2, may be configured as described above with reference to FIG. 2.

In the embodiment shown in FIG. 3, the data stream has a number of equally spaced partitions referred to as "checkpoints." Two checkpoints that follow one another (e.g., the second and third checkpoints in a data stream) may be referred to as "successive checkpoints." The distance between successive checkpoints (or, stated another way, the size of the partition between successive checkpoints) is denoted by a checkpoint value. Thus, if a checkpoint occurs every 10 bytes in a data stream, the checkpoint value for that data stream is 10 bytes. In the embodiment shown, the total amount of data to be received may be based in part on a checkpoint value indicating the number of the checkpoint at which the data stream is to be aborted.

In various embodiments, origin 210 may correspond to a hardware device or a software entity; the same is true of destination 220. Origin 210, in the illustrated embodiment, determines checkpoint value 370 for data stream 250. Value 370 indicates the size of a number of equally spaced partitions in the data stream. As shown, these checkpoints may be said to have an ordering, such that a second checkpoint that follows a first checkpoint may be said to be a "successive" checkpoint relative to the first checkpoint. An example of successive (or "adjacent") checkpoints is indicated by reference numeral 375 in FIG. 3. Checkpoint value 370 corresponds to this allocating of equally spaced checkpoints 375. In other words, in the embodiment shown, checkpoint value 370 is the distance between successive checkpoints 375. In some embodiments, this distance may correspond to a number of bytes, a number of bits, etc.

To determine the distance between equally spaced checkpoints, origin 210 may determine the total length of data stream 250 and then divide this value by a quantity that may be referred to as the "partition number value" of data stream 250. The partition number value (referred to by the variable D in various figures in this disclosure) connotes the number of equally spaced partitions or checkpoints into which the data stream is to be divided. In one embodiment, the partition number value is 256, which may be chosen because it can be encoded in one byte of data stream 250 (i.e., 1 byte=8 bits; $2^8$ bits=256 values). The selection of D=256 in various embodiments thus allows the location value to fit within a single byte in the data stream. In other words, by dividing a given data stream into 256 checkpoints, any one of those checkpoints may be identified by a single byte since $2^8$=256. This selection of D=256 thus allows a location value to fit within a single byte. This approach may be advantageous when utilizing a data stream format that has a single-byte value such as the out-of-band byte within an implementation of TCP on the WINDOWS® platform.

Checkpoint value 370 may be determined by dividing the total length of data stream 250 by 256. In the illustrated embodiment, after determining checkpoint value 370, origin 210 is configured to send checkpoint value 370 within data stream 350. In this example, checkpoint value 370 is determined and sent with data stream 350 before origin 210 receives an abort indication 235.

Note that for a given value of D and a given length value of a data stream L, the value L/D may not be an integer value. These extra bytes (i.e., the remainder of L/D) may be handled in any suitable manner. For example, consider a data stream of L=515 (i.e., bytes 1-515) where D=256, which results in a checkpoint value of 2, with 3 remaining bytes (515−512=3). In one embodiment, the first of the 256 partitions may correspond to bytes 4 and 5 in the data stream, with the $256^{th}$ partition corresponding to bytes 514 and 515. In such an implementation, bytes 1-3 of the data stream are not part of any partition.

When origin 210 receives abort indication 235, origin 210 is configured to determine location value 260 based on abort indication 235, and send location value 260 to destination 220. In some embodiments, as described below, the location value 260 may be included in the data stream 250.

Destination 220 receives location value 260 via software interface 230B, which indicates that communication of the data stream 250 has been aborted (e.g., as described above with reference to FIG. 2). Destination 220 is configured to use location value 260 and checkpoint value 370 to determine abort location 265 in data stream 250. For example, in one embodiment, location value 260 and checkpoint value 370 are multiplied to determine abort location 265, which is in turn usable to determine the remaining data 255 to be received. The result of this operation indicates abort location 265 to destination 220—this is the location at which destination 220 will end receiving remaining data 255. Alternately, if the receiving entity has buffered but not processed portions of data stream 250, abort location 265 may indicate a remaining amount of data to be read from the buffer. In some instances, destination 220 may receive a different or subsequent data stream as described above with reference to FIG. 2.

Figure 4:
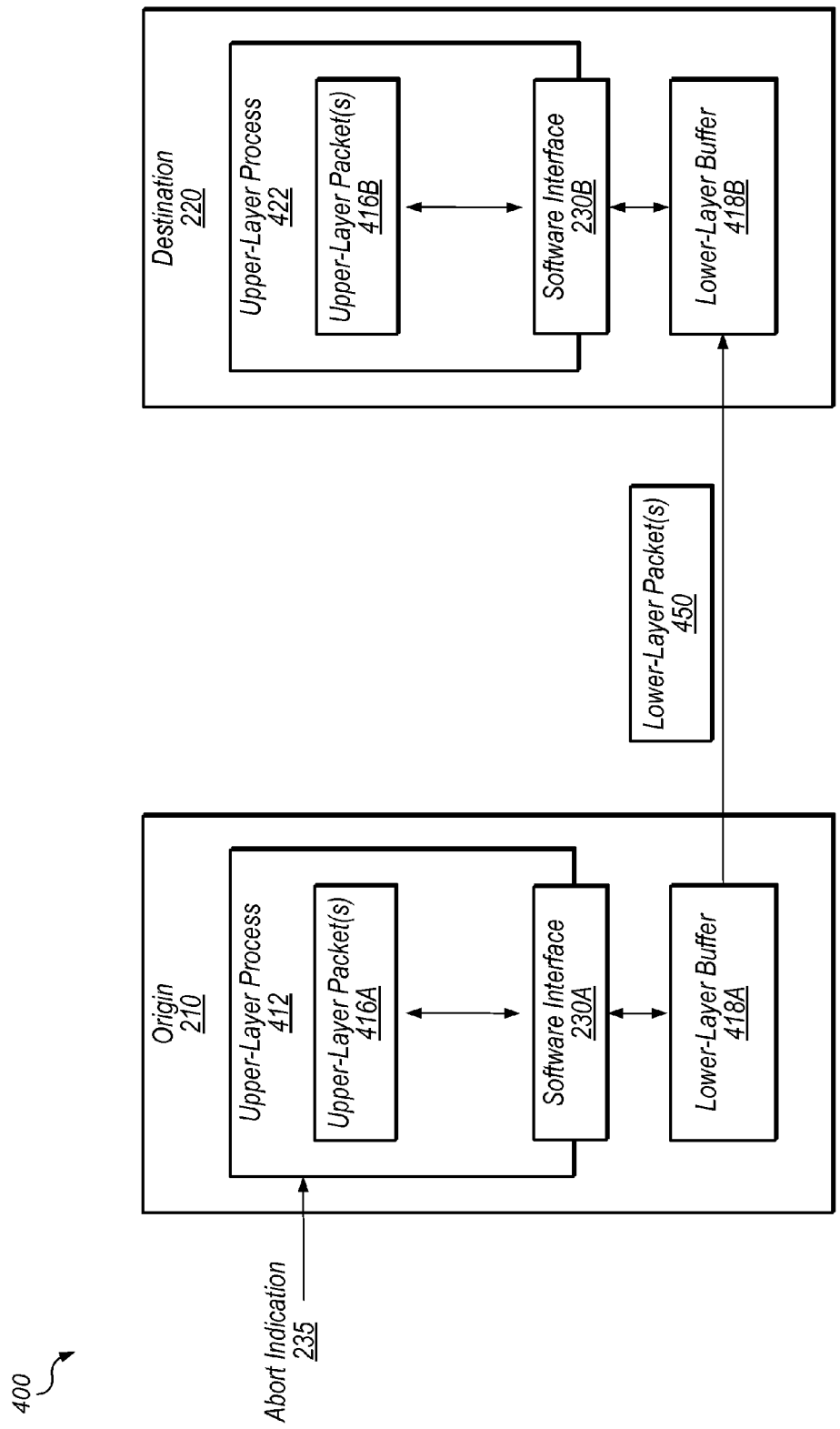
FIG. 4 is a block diagram illustrating one embodiment of a communication system having an origin and destination with respective upper-layer processes.

Turning now to FIG. 4, a block diagram illustrating one embodiment of a communication system 400 having an origin and destination with respective upper-layer processes is shown. As used herein, the phrase "layer" refers to a type of functionality that is provided in a network system. Some embodiments of communication system may be characterized by referring to functions of a plurality of layers, which may be arranged in a hierarchy. One layer in the hierarchy may provide information to a layer above it in the hierarchy, and receive information from a layer below it in the hierarchy. One example of a layered hierarchy is the Open Systems Interconnection (OSI) model, which includes 7 layers. The phrase "upper-layer process," as used herein, refers to a process that exists at a higher level in a hierarchy of layers than another process or entity. As one example, in the OSI model, an application-layer process is considered to be "upper-layer" relative to functionality existing at a lower layer such as the transport layer.

Figure 5:
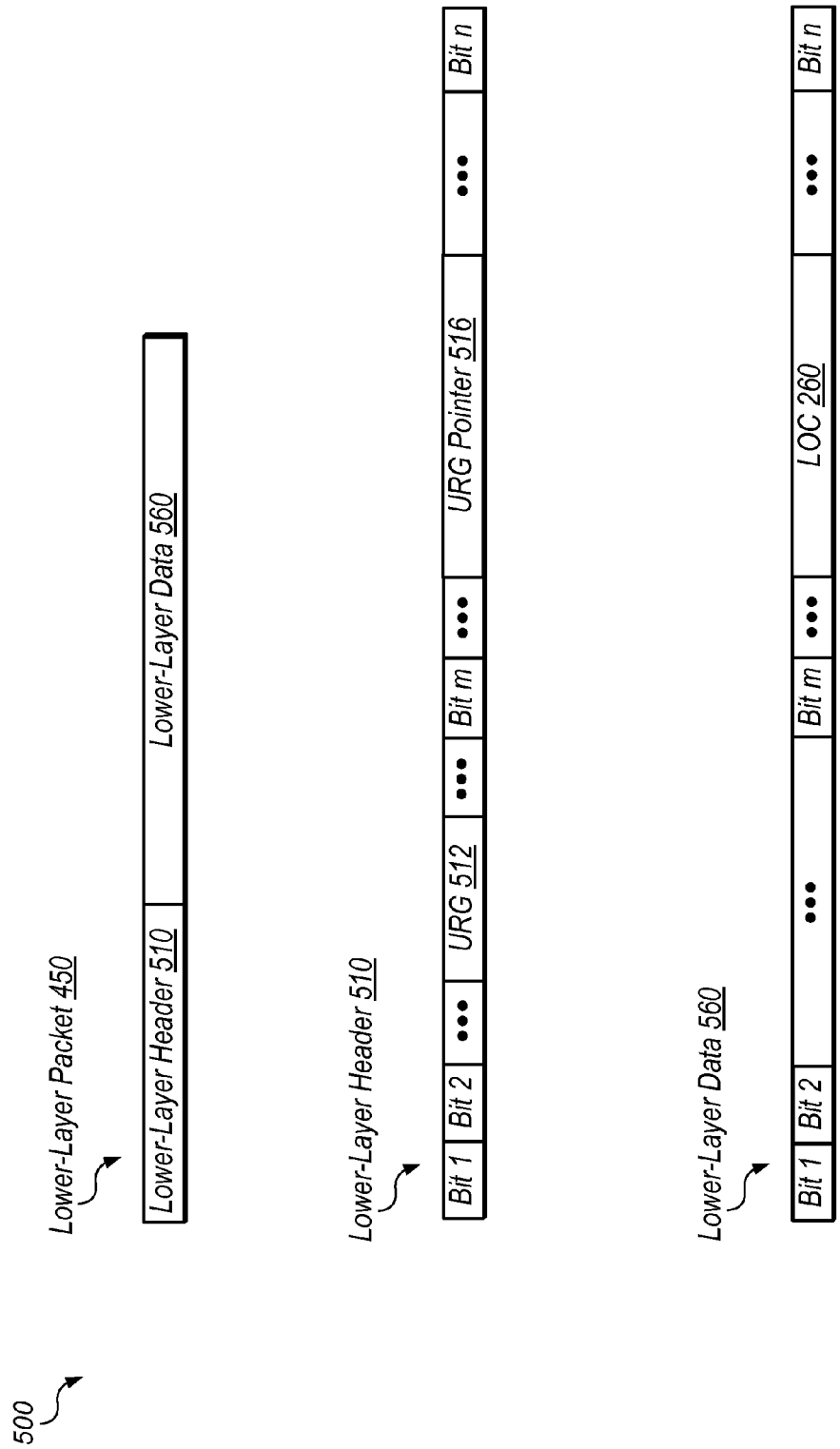
FIG. 5 illustrating one embodiment of a format of a lower-level communication packet.
Figure 6:
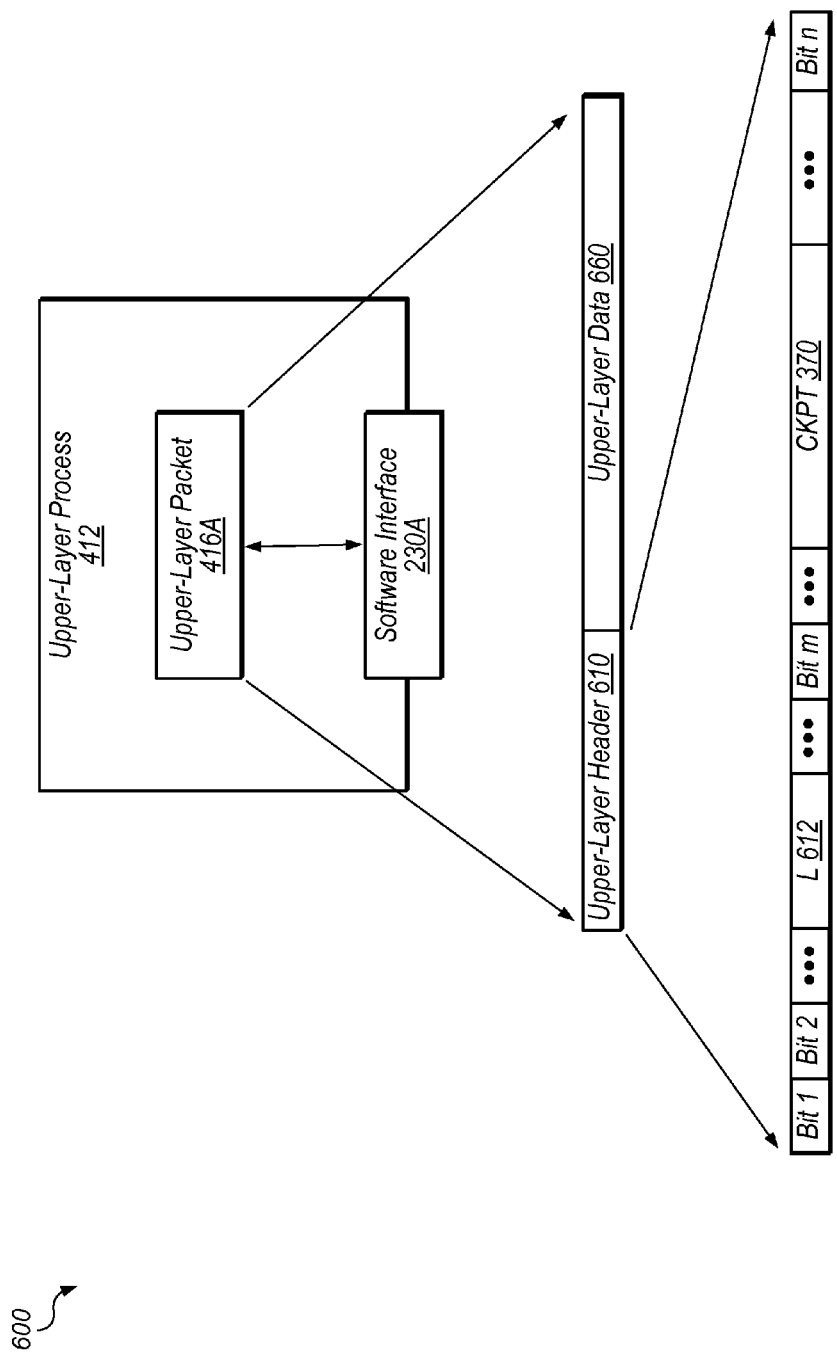
FIG. 6 illustrating one embodiment of a format of an upper-level communication packet.

As depicted, system 400 includes origin 210 and destination 220. In one embodiment, origin 210 and destination 220 may both be software entities executing on a common device. In other embodiments, origin 210 and destination 220 may correspond to distinct hardware devices. Origin 210 includes upper-layer process 412, and upper-layer packet(s) 416A are communicated to software interface 230A. Software interfaces 230 transform upper-layer packet(s) 416 to lower-layer packet(s) 450, and vice versa, to communicate between origin 210 and destination 220 via lower-layer buffers 418. Representative formats for lower-layer packet 450 and upper-layer packet 416A are shown in FIGS. 5 and 6, respectively. Destination 220 includes upper-layer process 422, which communicates upper-layer packet(s) 416B to software interface 230B. In one embodiment, upper-layer processes 412 and 422 may be application-layer processes such as FTP or HTTP.

As will be described further below, the existence of different layers permits certain functionality pertaining to a data stream to be distributed. For example, for a data stream composed of lower-layer packets 450 between buffers 418, an upper-layer process may calculate or send certain values such as a length of the data stream or a checkpoint value. This may be advantageous in certain situations, particularly where the upper-layer process already has ready access to certain information (e.g., the length of the data stream) or where it makes more sense from a programming standpoint for an upper-layer process to compute a certain value (e.g., a particular value can be computed more efficiently by an upper-layer process).

Turning briefly to FIG. 5, a block diagram illustrating one embodiment of a format of a lower-level communication packet 500 is shown. As depicted, lower-layer packet(s) 450 includes lower-layer header 510 and lower-layer data 560. Generally speaking, data 560 includes the "payload" portion of packet 450, while header 510 may include information specifying properties of data 560 and/or information usable to process data 560. Lower-layer header 510 includes, among other things, urgent (URG) indicator 512 and URG pointer 516. In various embodiments, URG indicator 512 and URG pointer 516 may occupy any number of bits within lower-layer header 510. Lower-layer data 560 includes location value 260. In various embodiments, location value 260 may occupy any number of bits within lower-layer data 560. In one embodiment, when URG 512 is set, this value indicates that URG pointer 516 is indicative of the position of location value 260 within the data stream.

Turning briefly to FIG. 6, a block diagram illustrating one embodiment of a format of an upper-level communication packet 600 is shown. Upper-layer packet(s) 416A includes upper-layer header 610 and upper-layer data 660. Upper-layer header 610 further includes length value (L) 612 and checkpoint value 370. In various embodiments, L value 612 and checkpoint value 370 may occupy any number of bits within upper-layer header 610. As noted above, L value 612 and checkpoint value 370 may be calculated by upper-layer process, and are usable in some embodiments to abort a data stream sent to a receiving entity.

Turning back to FIG. 4, consider an upper-layer process 412 that begins a data process. As used herein, "data process" is used broadly to refer to any type of process, operation, or function, in which data may be used. In one embodiment, the data process may generate a data stream. In one embodiment, upper-layer process 412 determines the length of the data stream (e.g., the number of upper-layer packets 416A) and sets the length value (L) 612 to that length. For example, L value 612 may express the size of the data stream in bytes. Upper-layer process 412 may also determine checkpoint value 370 for the data stream. In various embodiments, checkpoint value 370 may be determined as described above with reference to FIG. 3.

In one embodiment, checkpoint value 370 may be determined by upper-layer process 412, which may correspond to an application-level layer. In another embodiment, checkpoint value 370 may be determined at a lower-level layer. For example, checkpoint value 370 may be determined by a lower-level layer using software interface 230A. In such an instance, a lower-level protocol (e.g., a transport network-layer protocol like TCP) using a socket or API may determine the number of upper-layer packet(s) 416A to be encapsulated so that checkpoint value 370 can be determined.

In the embodiment shown, after upper-layer process 412 composes an upper-layer packet(s) 416A as described above with reference to FIG. 6, upper-layer process 412 communicates with upper-layer process 422 via software interfaces 230 and lower-layer buffers 418 using lower-layer packet(s) 450. As depicted, lower-layer packet(s) 450 are communicated from origin 210 to destination 220 via lower-layer buffers 418. Lower-layer buffers 418 may store lower-layer packets 418 temporarily for software interfaces 230. Software interfaces 230 transform upper-layer packet(s) 416 into lower-layer packet(s) 450, or vice versa. For example, in one embodiment, upper-layer packet(s) 416A is encapsulated into lower-layer data 560. In various embodiments, this transformation may occur using a socket or API as described above with reference to FIG. 2.

As depicted in FIG. 4, abort indication 235 may be communicated to upper-layer process 412, which is then communicated to software interface 230A. Abort indication 235 may be received as described above with reference to FIG. 1 Software interface 230A may then generate location value 260 based on abort indication 235 by determining location value 260 and storing location value 260 into lower-layer packet(s) 450. For example, location value 260 may be stored within lower-layer data 560. In one embodiment, software interface 230A is configured to determine location value 260 using checkpoint value 370 and the total length in bytes of upper-layer packet(s) 416A sent. For example, location value 260 may be determined in one embodiment by dividing the total length in bytes of upper-layer packets(s) 416A by checkpoint value 370. In response to receiving abort indication 235, software interface 230A may also set URG indicator 512 and determine URG pointer 516. In various embodiments, these determinations may occur before or after the determining of location value 260. In one embodiment, URG pointer 516 is configured to point to the location of location value 260 (e.g., an address) within lower-layer data 560. In this instance, URG indicator 512 is set to indicate that URG pointer 516 includes an address that points to location value. For example, URG indicator 512 may be a single bit; a value of '1' in that bit might indicate that the contents of URG pointer 516 are valid.

In the embodiment shown, lower-layer packet(s) 450 arrive at lower-layer buffer 418B with location value 260 in lower-layer data 560. In response to receiving location value 260, destination 220 is configured to abort receiving lower-layer packet(s) 450. In another embodiment, checkpoint value 370 and L value 612 within upper-layer header 610 may be encapsulated within lower-layer data 560. In this instance, destination 220 may abort receiving lower-layer packet(s) 450 in response to receiving location value 260, checkpoint value 370, and L value 612. In one embodiment, system 400 may abort receiving lower-layer packets(s) 450 immediately after receiving location value 260.

In one embodiment of communication system 400, destination 220 may determine an amount of remaining data 255 to be received or read from lower-layer packet(s) 450. After a first data stream is aborted, a different or subsequent data stream may be received and/or read by destination 220. In such an instance, the next lower-layer packet 450 boundary may be aligned and quickly read by destination 220.

Figure 7:
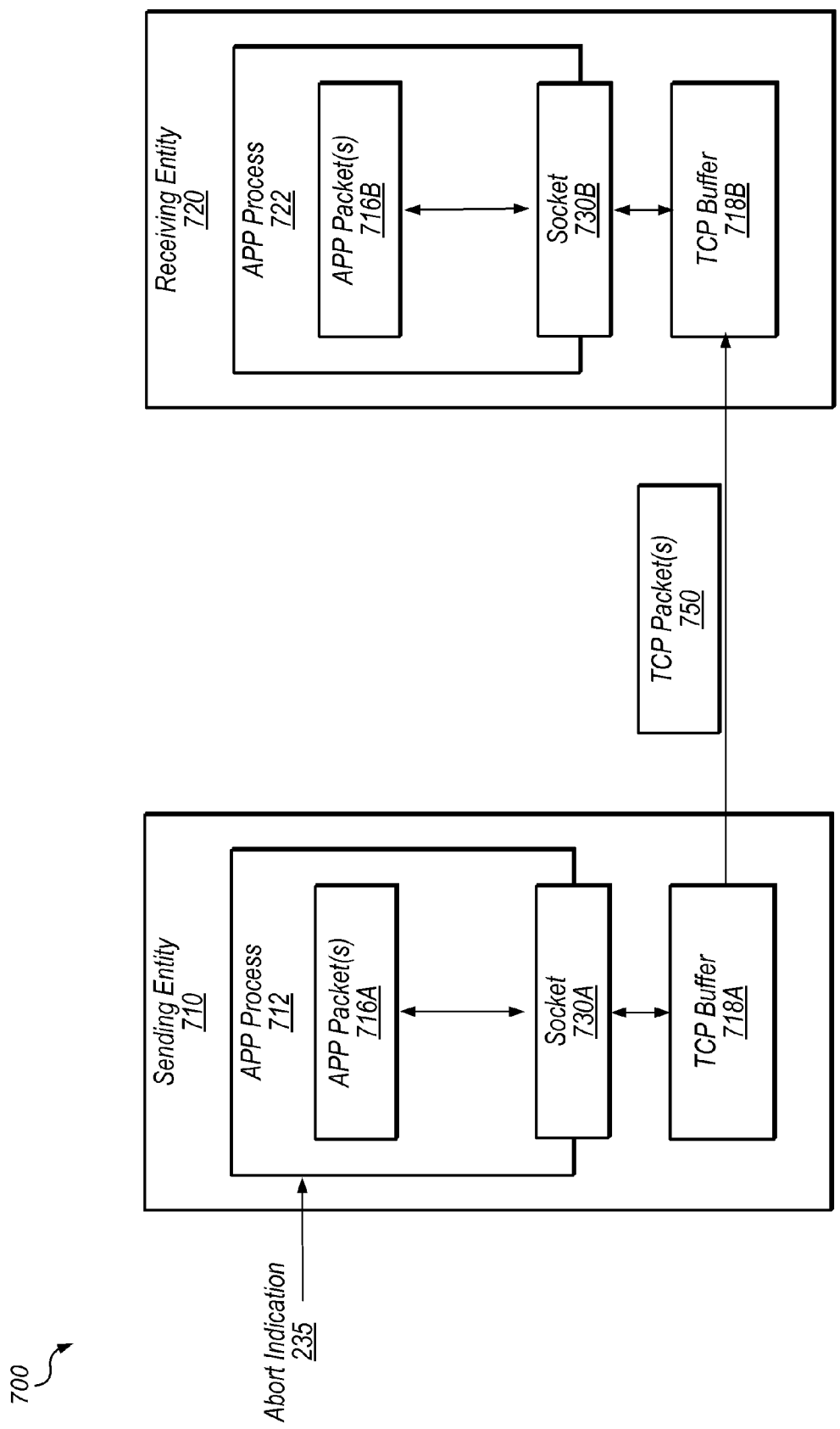
FIG. 7 is a block diagram illustrating one embodiment of a communication system that includes a TCP layer.

Turning now to FIG. 7, a block diagram illustrating one embodiment of a communication system 700 is shown. This figure is similar to FIG. 4, but specifically identifies the upper-layer process as an application-layer process and the lower-layer as a transport layer. Accordingly, communication between sending entity 710 and receiving entity involves two different layers of the OSI model. Components shown in FIG. 7 are numbered similarly to corresponding components described above with reference to FIGS. 4-6. In various embodiments of system 700, APP process 712 and APP process 722 may be software applications executing on origin 210 and destination 220, respectively. In another embodiment, origin 210 and destination 220 are distinct hardware devices.

In one embodiment, APP packet(s) 716A may include an APP header and APP data similar to upper-layer header 610 and upper-layer data 660 as described above with reference to FIG. 6. In some embodiments, the APP header includes a length value and a checkpoint value (e.g., L value 612 and checkpoint value 370, respectively). In such embodiments, APP process 712 may determine checkpoint value 370 based on the L value and checkpoint value as described above with reference to FIGS. 4-6.

In the embodiment shown, TCP packet(s) 750 may include TCP header and TCP data similar to lower-layer header 510 and lower-layer data 560. TCP packet(s) 750 may operate as lower-layer packet(s) 450 as described with reference to FIGS. 4-6. In one embodiment, TCP packet(s) 750 are implemented using Berkeley Software Distribution (BSD). In one instance, TCP packet(s) 750 may also include an urgent bit, urgent pointer, and an out-of-band (OOB) byte, which may correspond to URG indicator 512, URG pointer 516, and location value 260, respectively. The urgent bit may be used to indicate the location of the OOB byte (i.e., the location of location value 260) within TCP packet(s) 750. In another embodiment of FIG. 4, the lower-layer protocol may be X.25, which also uses OOB data. The OOB data may correspond in some embodiments to location value 260. In various embodiments, location value 260 may correspond to out-of-band data within a given communication protocol. The phrase "out-of-band data," used in reference herein with respect to a communication protocol broadly refers to data in a data stream that is identified and received in a manner that differs from processing of other data in the stream. Thus, in some instances, out-of-band data may be identified by setting a specific value that indicates its presence; the presence of out-of-band data may also cause a receiving entity to alter the sequence in which it receives and processes data (e.g., an out-of-band data indicator may cause a receiving entity to process that data immediately, as opposed to the in-band data that would otherwise be processed). Using the location value, a different or subsequent data stream may be efficiently received destination 220 as described above with reference to FIGS. 4-6.

Consider again one embodiment of communication system 100, which may implement a WINDOWS® platform on destination 120 (origin 110 may also be a WINDOWS® platform or other type of platform). Such a platform may remove the OOB byte from the data stream 150 into another data stream, with the result that destination 120 cannot immediately abort or align a subsequent data stream. Instead, destination 120 may continue reading data stream 150 even though it has been aborted. Further, a subsequent data stream may be read in error when the OOB byte is removed because data stream 150 and the subsequent data stream are misaligned. In contrast, an instance of system 700 that uses a WINDOWS® platform destination 220 may quickly abort reception of TCP packet(s) 750 when receiving location value 260 (e.g., within one TCP packet 750). A user that initiated abort indication 235 (e.g., via Ctrl+C) may, in some instances, observe a more efficient response using system 700 as compared to system 100. Because TCP packet 750 may be aligned quickly, destination 220 may quickly begin reading a different or subsequent data operation begun by APP process 712.

With this framework in mind, various methods and examples for aborting a data stream may now be described. A general method for aborting a data stream from the perspective of a receiving entity is described next with respect to FIG. 8a; a more specific method is described with respect to FIG. 8b. Even more detailed methods are provided from the perspective of sending and receiving entities with respect to FIGS. 9a and 9b. Specific examples of aborting a data stream are then described with respect to FIGS. 10 and 10b (from the sending and receiving perspectives, respectively). Note that a "receiving entity" or a "sending entity" is a broad term that encompasses both hardware entities (e.g., a processor) and software entities (e.g., a process).

Figure 8A:
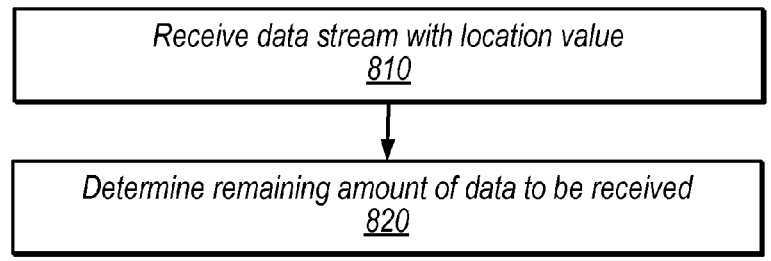
FIG. 8a is a flow diagram illustrating an exemplary method for aborting a data stream using a location value.

Turning now to FIG. 8a, a flow diagram illustrating an exemplary method 800 for aborting a data stream using a location value is shown. For example, in one embodiment, method 800 may be performed at any receiving entity, including destination 220 described in FIG. 2. As also described above, the receiving entity may, in some embodiments, be located on the same physical device as the sending entity.

At block 810, a data stream with a location value is received at the receiving entity. For example, a software entity may receive the data stream via an API. Alternately, a hardware entity may receive the data stream via any suitable physical interface (wired, wireless, etc.). In one embodiment, destination 220 receives data stream 250 and location value 260 using software interface 230B. In another embodiment, lower-layer buffer 418B may receive lower-layer packet(s) 450 with location value 260. At block 820, a remaining amount of data to be received from the data stream is determined. (In an alternate version of method 800, a receiving entity may already have received some portion of the data stream; however, that data may not have actually been read. Accordingly, in a variant of method 800, block 820 may involve determining a remaining amount of data to be read.) In one embodiment, the receiving entity uses the location value to determine an abort location.

FIG. 8a represents a generic version of a method that can be performed by a receiving entity. More specific versions of method 800 are contemplated, including those that use other values in addition to a location value to compute the abort location. One specific method that uses a checkpoint value is described next with respect to FIG. 8b.

Figure 8B:
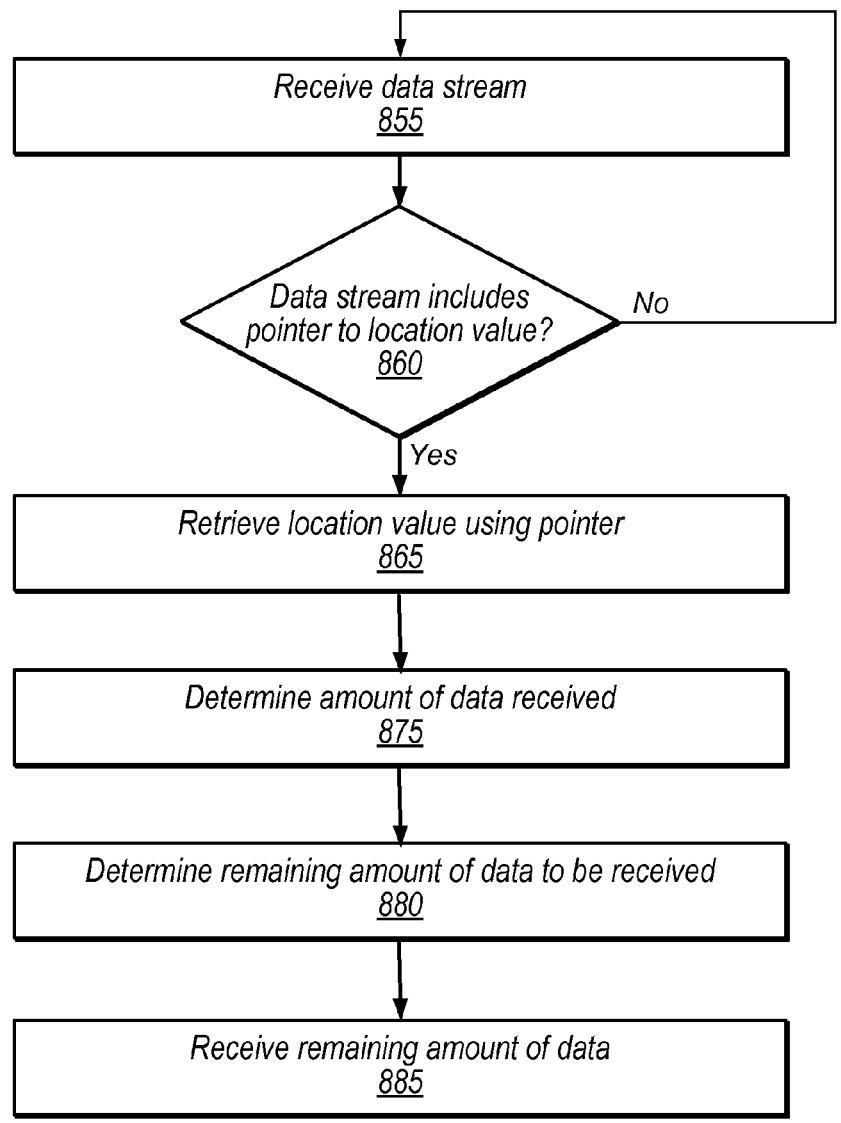
FIG. 8b is a flow diagram illustrating another exemplary method for aborting a data stream using a location value.

Turning now to FIG. 8b, a flow diagram illustrating an exemplary method 850 for aborting a data stream using a location value is shown. As with method 800, method 850 may be performed by any receiving entity.

At block 855, a receiving entity receives a data stream from a sending entity. This may occur in a manner similar to that described above with reference to block 810 in FIG. 8a. For example, in one embodiment, destination 220 receives or reads a data stream composed of lower-layer packet(s) 450, as described with reference to FIG. 4. Flow proceeds to decision block 860.

At decision block 860, it is determined whether the data stream includes a pointer to a location value. As noted above, in various embodiments, the presence of a location value is usable to determine an abort location for the data stream. In the embodiment described above with reference to FIG. 4, lower-layer packet(s) 450 may include an URG pointer 516. In one embodiment, an indication (e.g., URG indicator 512) is set to a certain value indicating that the data stream includes a valid value at the location pointed to by URG pointer 516. The upper layer can retrieve this indication using appropriate software interface/APIs in one embodiment. If the data stream does not include a pointer to the location value, flow proceeds back to block 855, where additional portions of the data stream may be received. On the other hand, if a pointer to a location value is present in the data stream, flow proceeds to block 865.

At block 865, a location value is retrieved using the pointer determined in block 860. In one embodiment, URG indicator 512 indicates a valid value so that software interface 230B (e.g., an API) accesses location value 260 using the address stored in URG pointer 516. The determination that the data stream includes a location value indicates in one embodiment that the receiving entity (e.g., destination 220) should abort receiving the data stream. As described above with reference to FIG. 2, the location value may directly or indirectly specify an abort location for the data stream. Flow proceeds to block 875.

At block 875, the amount of data that has been received (or read) from the received data stream is determined. This operation may be performed in a number of different ways known to those of skill in the art. For example, in one embodiment, a counter may be used to keep track of the bytes received (or read). Flow proceeds to block 880.

At block 880, the remaining amount of data to be received (or read) from the data stream is determined. In one embodiment, this determination is made by first determining a total amount of data to be received or read, and then subtracting the amount of data that has already been received or read (i.e., the value determined at block 875). In one embodiment, the total amount of data to be received or read may be determined from a value explicitly indicating this quantity (e.g., abort after receiving N number of bytes).

In another embodiment, the total amount of data to be received or read may be based in part on a checkpoint value. In various embodiments, the checkpoint value may be received by a receiving entity or determined by that entity from other information. In one implementation, a receiving entity may compute the checkpoint value from a value indicating the length of the data stream (e.g., L value 612). This length value may have been received by the receiving entity in a previous packet. Thus, in this implementation, because the receiving entity has computed the checkpoint value, retrieving the same checkpoint value in a packet sent from the sending entity is not necessary.

In embodiments in which a checkpoint value is used to determine a total amount of data to read, this value may be determined by multiplying the location value by the checkpoint value. For example, suppose that for a given data stream, the checkpoint value is 4 bytes, and that the location value is 200. Multiplying these two value indicates that 800 total bytes should be read from the stream. In one embodiment, the remaining amount of data to be read may be determined by subtracting the amount of data that has already been read (determined in block 875) from the product of the checkpoint value and the location value. Continuing with the same example, if block 875 determines that 797 bytes have already been read, 3 bytes remain to be read. A specific method for computing the remaining amount of data to be read is described further with respect to FIG. 9b.

At block 885, the remaining amount of data computed in block 880 is read. In one embodiment, the receiving entity may simply read a group of information (e.g., bytes) equal to the remaining data value determined in block 880. In another embodiment, the receiving entity may not use the remaining data value determined in block 880. Instead, the receiving entity may perform a series of one or more reads and then repeatedly check to see if the current read location is at the abort location. Various other options will be apparent to those of skill in the art.

Upon reading the remaining amount of data, the receiving entity may have effectively identified the beginning of a data stream that is different from the current data stream that was read in block 855. Because the receiving entity has computed the remaining amount of data to be read from the current data stream in block 880 and then read that data in block 885, it may be aligned with the end of the current data stream (and, by extension, the start of the new data stream). In this manner, the boundary between data streams is efficiently identified.

Figure 9A:
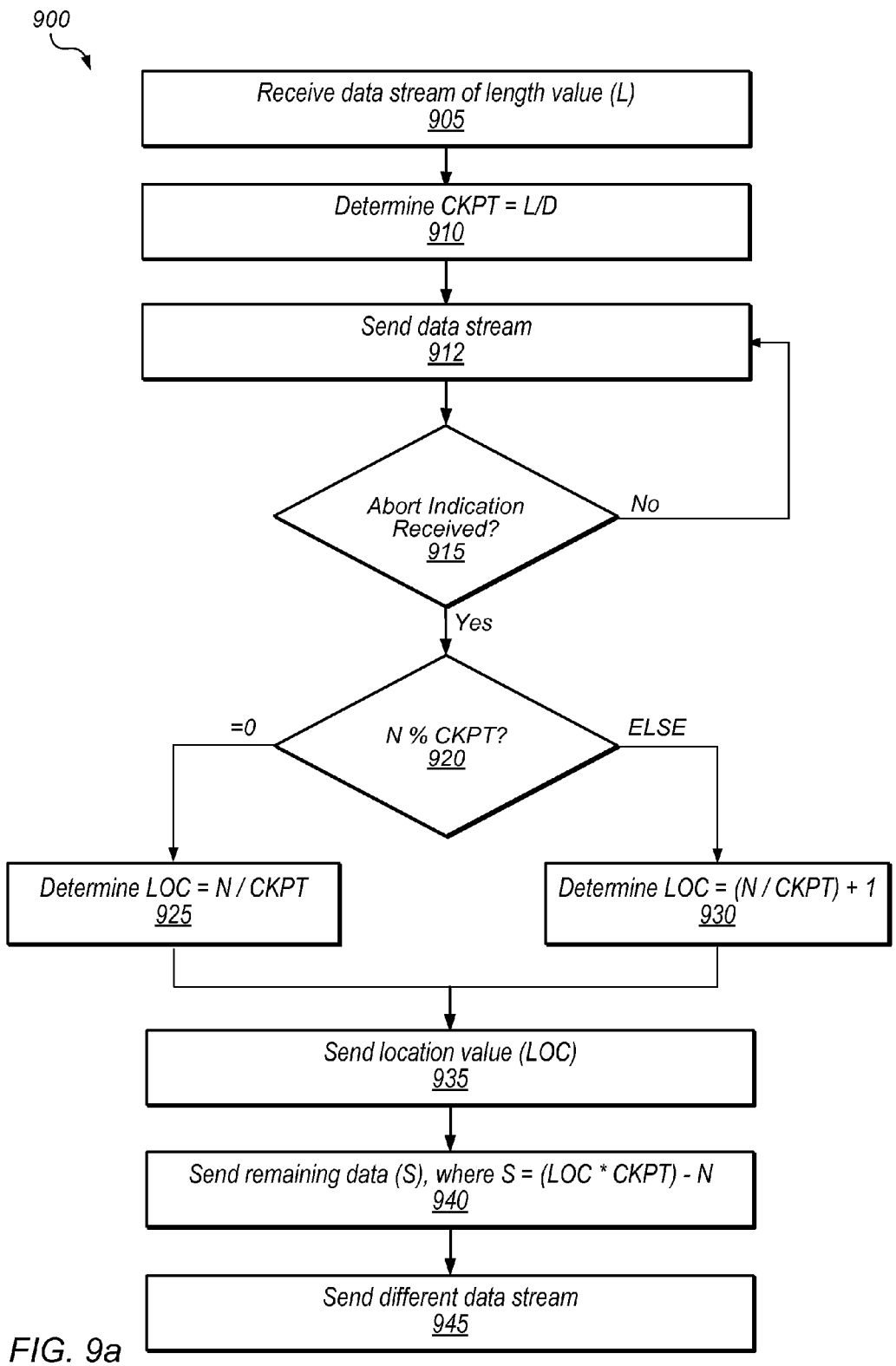
FIG. 9a is a flow diagram illustrating an exemplary method for aborting a data stream using a location value and a checkpoint value, shown from the perspective of a sending entity.
Figure 9B:
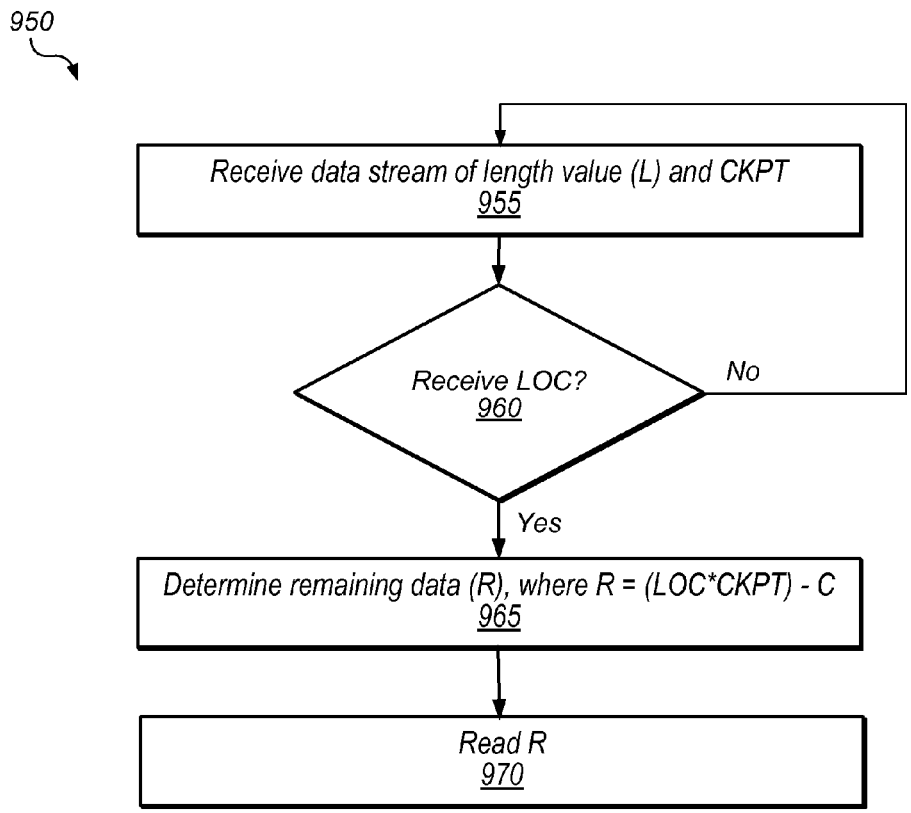
FIG. 9b is a flow diagram illustrating an exemplary method for aborting a data stream using a location value and a checkpoint value, shown from the perspective of a receiving entity.

Turning now to FIGS. 9a and 9b, flow diagrams illustrating exemplary methods for aborting a data stream are shown. Method 900 in FIG. 9a depicts operations that may occur at the sending entity, while method 950 in FIG. 9b depicts operations that may occur at the receiving entity. In the embodiments shown in FIGS. 9a and 9b, a location value and a checkpoint value are used to facilitate aborting of the data stream. Methods 900 and 950 may be performed by any suitable sending and receiving entities, respectively.

In method 900 shown in FIG. 9a, flow begins at block 905, in which a sending entity receives a data stream of a length value (L). In this context, the sending entity "receiving" the data stream includes receiving the data stream from another entity (either hardware or software), and also includes other embodiments in which the sending entity itself generates the contents of the data stream. For example, a sending entity with an upper-layer process 412 may generate a data stream having upper-layer packet(s) 416A, which might have a length value (L) of 2,560 bytes. In one embodiment, this data stream may correspond to a data operation begun by upper-layer process 412. In some embodiments, the length value (L) of the data stream is determined by a process (e.g., upper-layer process 412) evaluating the total data needed to complete a data operation or data process performed by that process. For example, with reference to FIG. 7, an application-layer process 712 such as an HTTP process may determine that the it needs to send 2,560 bytes for a line of text on a webpage.

Next, at block 910, a checkpoint value (CKPT) is determined. In one embodiment, the checkpoint value is determined by dividing the length of the data stream (L) by the partition number value (D) described above with reference to FIG. 3. As described above, in one embodiment, the data stream is partitioned into 256 checkpoints. Accordingly, a checkpoint value determined using the formula CKPT=L/D corresponds to the size of a given one of these partitions. Applying this formula, the checkpoint value for the exemplary data stream discussed in the preceding paragraph is 10 bytes (2,560/256). As will be described below, in some embodiments, data streams are aborted at checkpoints.

In block 912, the sending entity begins sending the data stream to the receiving entity via any suitable interface and at any applicable network layer. For example, the data stream may be sent over a TCP connection in one embodiment. This TCP connection may use a network-layer connection such as an IP connection. In another embodiment, the data stream may be sent over a wireless connection such as 802.11 protocol. In some embodiments, the sending of the data stream may commence before determining L and CKPT. In other embodiments, these values are determined before beginning to send the data stream to the receiving entity. Thus, blocks 905, 910, and 912 may be performed in any suitable order.

At decision block 915, the sending entity determines if an abort indication has been received. An abort indication may be detected in one embodiment in response to an interrupt. In one example, in one embodiment, the receiving entity may receive an interrupt that indicates that the user has entered a command that indicates that sending of the data stream should be aborted. In one embodiment, the command may correspond to a key sequence (e.g., Ctrl+C). In other embodiments, a sending entity may receive input from a process that indicates that the data stream should be aborted (e.g., upper-layer process 412).

If no abort indication has been received, flow proceeds back to block 912, where the sending entity continues to send the data stream to the receiving entity. On the other hand, if an abort indication has been received, flow proceeds to decision block 920. Method 900 thus includes the sending entity sending the data stream to the receiving entity until an abort indication is received. (If no abort indication is received for a particular data stream, method 900 is not applicable.)

At decision block 920, a modulo operation is performed. This operation is indicated by the expression N % CKPT, which refers to the remainder when N is divided by CKPT. The value N refers to the amount of data that has been sent in the data stream. The value N % CKPT thus indicates whether receipt of the abort indication aligns with a checkpoint or not (that is, whether the last portion of data sent before the abort indication is received completes a current checkpoint). For example, if a checkpoint size for a particular data stream is 10 bytes and an abort indication is received upon sending 100 bytes, the abort indication aligns with the tenth checkpoint. An abort indication that aligns with a checkpoint thus results in a value of 0 for the N % CKPT operation; otherwise the modulo operation results in a non-zero value. Flow proceeds to blocks 925 and 930 upon the former and latter conditions, respectively.

A location value (LOC) is determined at blocks 925 and 930 depending upon the value of the modulo operation determined in block 925. At block 925, the location value is set to the integer portion resulting from dividing N by the CKPT value. At block 930, the location value is determined the same way as in block 925, except that 1 is added to the result. In this manner, the location value is set to the number of the next checkpoint after receiving the abort indication. Suppose N=100 bytes and CKPT=4 bytes. In this case, LOC=25. The location value thus indicates that the data stream should be aborted upon the $25^{th}$ checkpoint (i.e., 100 bytes). Alternately, suppose N=95 bytes and CKPT=4 bytes. In this example, LOC still equals 25 (95/25+1=3+1=4). In both cases, the location value indicates that the data stream should be aborted at the $25^{th}$ checkpoint. If, on the other hand, N=101 bytes and CKPT=4 bytes, LOC will be 26, indicating that the data stream should be aborted at the $26^{th}$ checkpoint (i.e., after 104 bytes). Flow proceeds to block 935 from either of blocks 925 and block 930. Note that blocks 925 and 930 may be implemented as a single function in one embodiment; however, they are shown as separate blocks for purposes of illustration.

At block 935, the location value is sent to the receiving entity. This operation may occur at any network layer and via any type of physical interface. In various embodiments, the operation of block 935 may occur over a TCP connection. In various embodiments, the location value may be sent to the receiving entity via any of a variety of means, including a computer bus, local or wide-area network, wired or wireless interface, etc.

Flow then proceeds to block 940, at which the sending entity sends the remaining data (S), which corresponds to the checkpoint indicated by the location value LOC computed in block 925 or 930. The amount of the remaining data (S) is calculated using the location value (LOC), the checkpoint value (CKPT), and the amount of data sent (N). Using the formula indicated in block 940, S is computed to correspond to the amount of data remaining to the next checkpoint (i.e., the checkpoint indicated by LOC). As depicted, location value and checkpoint value are multiplied; the amount of data that has already been sent is then subtracted from this product. Other means of determining S are also possible. Once the sending entity determines S, this amount of remaining data is sent. Note that in situations in which an abort indication aligns with a checkpoint value, S=0, meaning that there is no remaining data to be sent. Flow proceeds to block 945.

At block 945, with the sending of the aborted data stream completed, the sending entity may now send a different data stream. This operation need not be performed if there is no subsequent data stream to send. If there is another data stream to send, the sending entity can begin sending that data stream once the last S bytes of the previous data stream have been sent. The subsequent data stream may be sent immediately because abort location 265 indicates alignment of the different data stream following data stream 250.

Turning now to FIG. 9b, a flow diagram illustrating an exemplary method 950 for aborting a data stream using a location value and a checkpoint value is shown. As with method 850, method 900 may be performed by any receiving entity. Flow begins at block 955. At block 955, the receiving entity receives a data stream with a length value (L) and a checkpoint value. In one embodiment, the data stream may be sent as described above with reference to FIG. 9a. For example, the length value and the checkpoint value may be received when lower-layer packet(s) 450 corresponding to a certain data operation at upper-layer process 412 is received. Flow proceeds to decision block 960.

At decision block 960, the receiving entity determines if a location value has been received. In one embodiment, this determination may be made through a notification provided by transport protocol. For example, as described above with reference to FIGS. 4-6, the transport layer (e.g., TCP) on the receiving entity such as destination 220 may locate location value 260 using URG pointer 516 that is set in the data stream and generate a notification to upper layer process 412. In another embodiment, process 412 may periodically poll the transport layer for availability of out-of-band data. As described above, reception of a location value indicates that receiving of the data stream is to be aborted. If a location value has not been received, flow proceeds back to block 955 and the receiving entity continues to receive the data stream. If LOC has been received, flow proceeds to block 965. Blocks 955 and 965 can jointly be said to describe a method in which a receiving entity receives a data stream until a location value is received.

At block 965, having received an indication that the data stream is to be aborted (the location value), the receiving entity determines the amount of remaining data (R) to be read. As indicated in FIG. 9b, R may be calculated by determining in one embodiment by computing the total amount of data to be read by multiplying the location value (LOC) by the checkpoint value (CKPT), and then subtracting C, the amount of data that has already been read. The value LOC*CKPT provides the location in the data stream at which receiving should be aborted; subtracting C from this value provides the remaining amount of data R to be read. As noted above, in this embodiment, the data stream is aborted such that it is aligned with the next checkpoint in the stream. After R is determined, flow proceeds to block 970, where destination 220 actually reads remaining data (R). This may occur as described above with reference to FIG. 8b. In some instances, this may mean that there is no remaining data to be read. Flow ends at block 970.

Figure 10A:
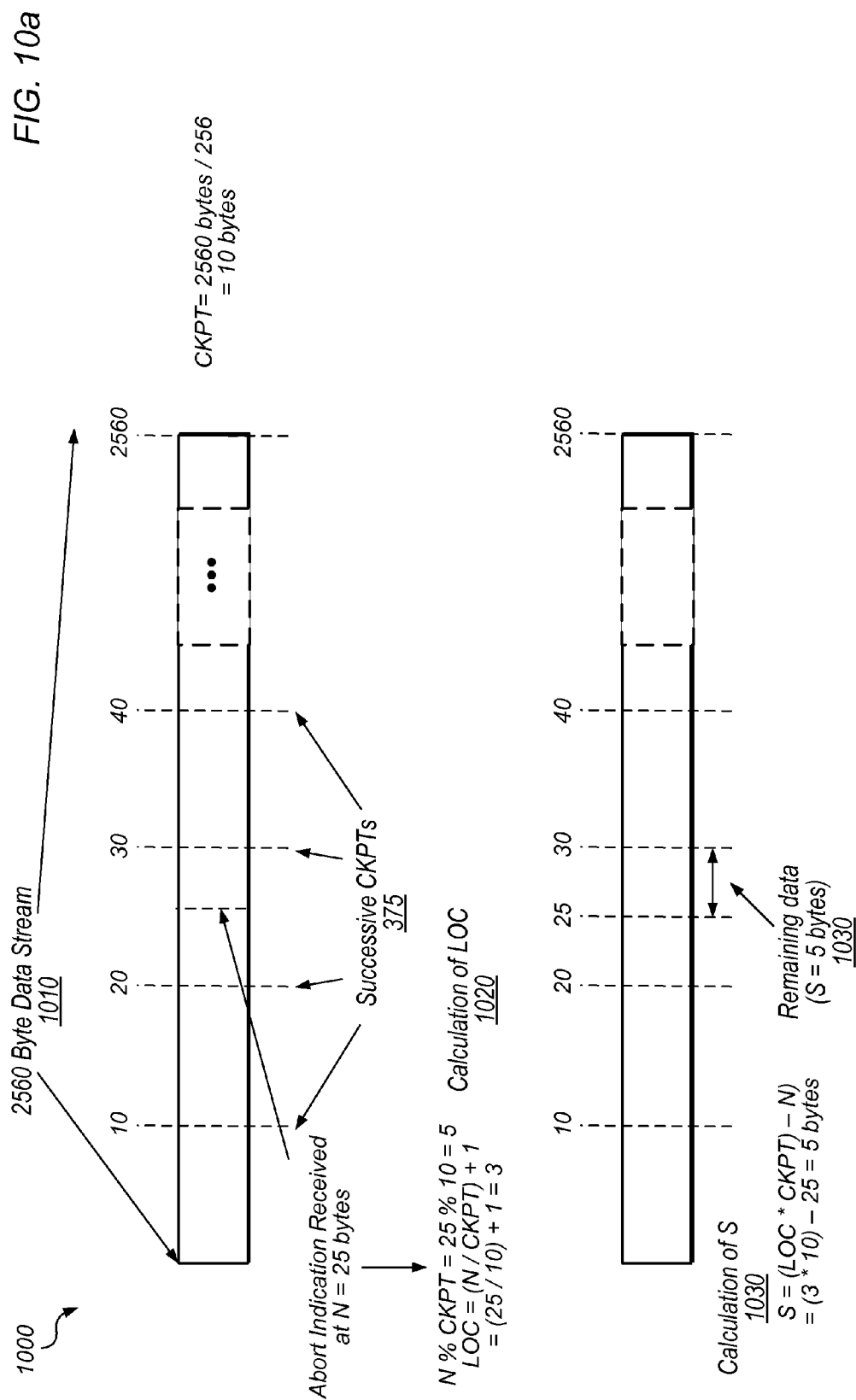
FIG. 10a is an example illustrating one embodiment of aborting a data stream using a location value and a checkpoint value, shown from the perspective of a sending entity.

Turning now to FIG. 10a, an example 1000 illustrates one embodiment of aborting of a data stream from the perspective of a sending entity. This example follows method 900 described above with reference to FIG. 9a. As indicated by reference numeral 1010, the data stream in example 1000 is 2560 bytes long.

Example 1000 shows that the checkpoint value for the data stream is 10 bytes, computing by dividing the data stream length by the partition number value (described above as D). As described above, the partition number value indicates the number of checkpoints into which the data stream is to be partitioned. In this example, the partition number value is 256. In one embodiment, this size for the partition number value allows it to be contained within a single byte in the data stream. Example 1000 thus shows a conceptualization of the partitioning of the data stream, in which it is partitioned into 256 checkpoints of 10 bytes each. Example 1000 also illustrates the concept of "successive checkpoints" as indicated by reference numeral 375; here, the first, second, third, and fourth checkpoints in the data stream are illustrated. Note that at byte 15 in the data stream, the "next" checkpoint would be the second checkpoint (byte 20).

As shown in example 1000, an abort indication is received 25 bytes into the data stream (N=25). Reference numeral 1020 illustrates the corresponding calculation of the location value LOC as 3, using the formula from block 930 of FIG. 9a. This value indicates that aborting the sending (and, ultimately, the receiving) of the data stream should occur at the third checkpoint (equivalent to 30 bytes). This value may then be sent to the receiving entity.

As indicated at reference numeral 1030, the remaining data to be sent (S) is calculated using the location value, checkpoint value, and amount of data sent (N) as described above with reference to block 940 in FIG. 9a. In this example, remaining data to be sent is 5 bytes (abort location minus N, or 30−25). Accordingly, the entity receiving the data stream depicted in example 1000 should preferably abort the data stream after receiving 30 bytes. A corresponding example from the receiving entity's perspective is described next.

Figure 10B:
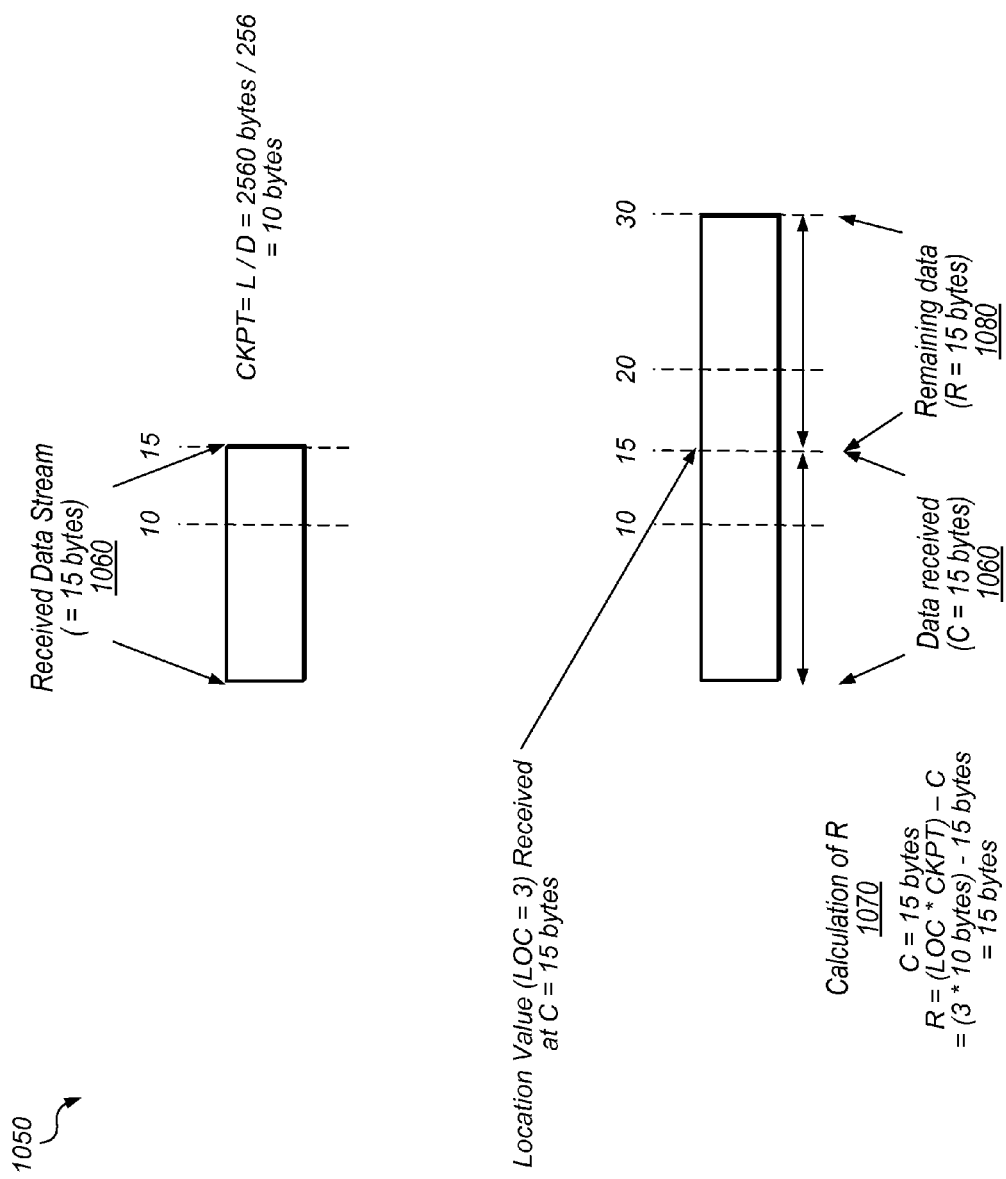
FIG. 10b is an example illustrating one embodiment of aborting a data stream using a location value and a checkpoint value, shown from the perspective of a receiving entity.

Turning now to FIG. 10b, an example 1050 illustrates one embodiment of aborting a data stream from the perspective of a receiving entity. This example follows method 950 described above with reference to FIG. 9b. At the point in time indicated by reference numeral 1060, the received data stream is 15 bytes long (i.e., the receiving entity has read 15 bytes). The received data stream corresponds to a portion of the data stream sent in example 1000 described with reference to FIG. 10a. Accordingly, the checkpoint value for the data stream is 10 bytes, based on a partitioning of the data stream into 256 segments as explained above. Example 1050 shows a conceptualization of a partitioning of the received portion of the data stream. As shown, because the received data stream is 15 bytes, this portion contains only one full checkpoint (10 bytes), and a partial remaining portion (5 bytes).

As indicated in example 1050, location value 3 is received 15 bytes into the reading of the received data stream (C=15), as indicated by reference numeral 1060. The location value indicates that the entire data stream will not be sent, and that reading of the data stream should continue only until the third checkpoint is reached (i.e., at 30 bytes). As shown by the calculation indicated by reference numeral 1070, the remaining data to be read (R) is calculated using the location value, checkpoint value, and amount of data read (C) as described above with reference to block 965 in FIG. 9b. In this example, the remaining data to be read is 15 bytes, as indicated by reference numeral 1080. Accordingly, in this example, the receiving entity will abort the data stream after reading 15 more bytes.

Note that in some embodiments, there may be a distinction between a receiving entity receiving data in a data stream (e.g., storing portions of the data stream in a buffer) and actually reading, or interpreting the received data (e.g., reading the data from a buffer). For example, in one embodiment of example 1050, the receiving entity may have actually received more than 15 bytes of the data stream, but has only processed 15 of those bytes when the location value is received; accordingly, the receiving entity will process the 15 remaining bytes In another embodiment of example 1050, the receiving entity has received 15 bytes when the location value is received, and will continue to receive 15 remaining bytes. As used herein and unless specified otherwise, the term "receiving" a data stream is broad enough to encompass receiving and/or reading data in a data stream.

Figure 11:
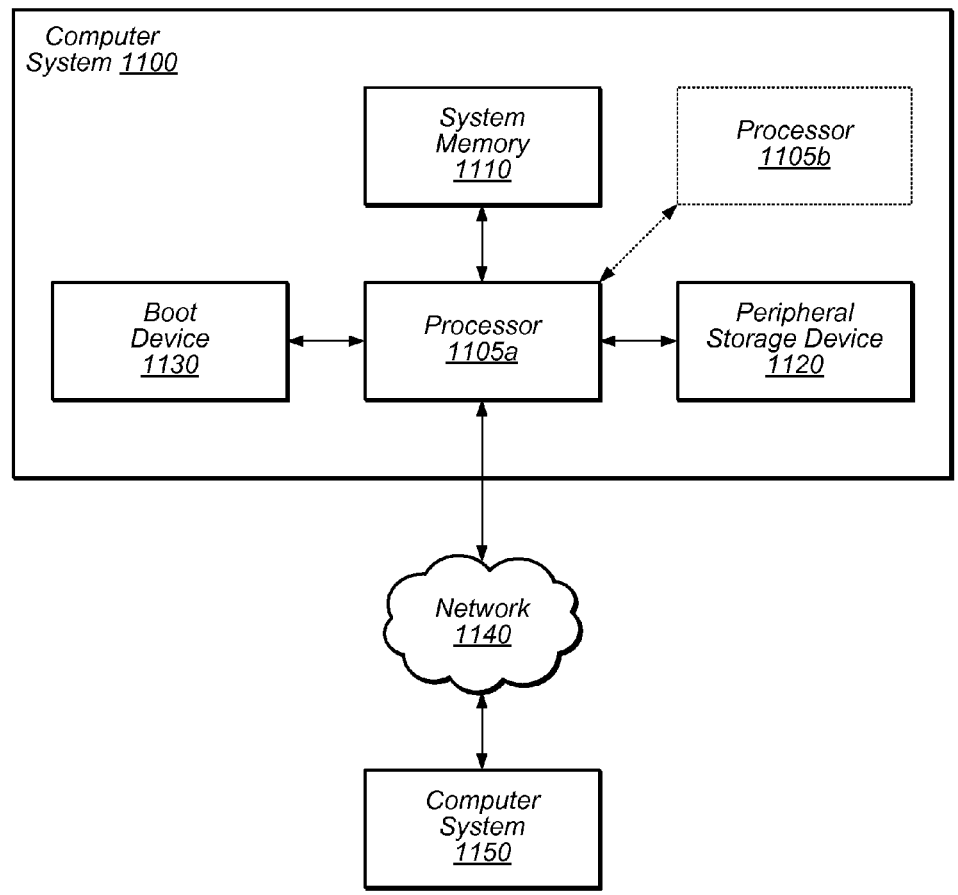
FIG. 11 is a block diagram illustrating one embodiment of a computer system.

Turning now to FIG. 11, a block diagram of a computer system 1100 is shown. Computer system 1100 may correspond to a sending or a receiving entity as described herein. In the illustrated embodiment, system 1100 includes a processor 1105a that is coupled to a system memory 1110, a peripheral storage device 1120 and a boot device 1130. System 1100 is coupled to a network 1140, which is in turn coupled to another computer system 1150. In some embodiments, system 1100 may include more than one instance of the devices shown. In various embodiments, system 1100 may be configured as a rack-mountable server system, a standalone system, or in any other suitable form factor. In some embodiments, system 1100 may be configured as a client system rather than a server system.

In some embodiments, system 1100 may be configured as a multiprocessor system, in which processor 1105a may optionally be coupled to one or more other instances of processor 10, shown in FIG. 11 as processor 1105b.

In various embodiments, system memory 1110 may comprise any suitable type of system memory as described above, such as FB-DIMM, DDR/DDR2/DDR3/DDR4 SDRAM, RDRAM®, flash memory, and of various types of ROM, etc. Also, in some embodiments, system memory 1110 may include multiple different types of memory.

Peripheral storage device 1120, in various embodiments, may include support for magnetic, optical, or solid-state storage media such as hard drives, optical disks, nonvolatile RAM devices, etc. In some embodiments, peripheral storage device 1120 may include more complex storage devices such as disk arrays or storage area networks (SANs), which may be coupled to processor 1105 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 1105, such as multimedia devices, graphics/display devices, standard input/output devices, etc.

As described previously, in one embodiment boot device 1130 may include a device such as an FPGA or ASIC configured to coordinate initialization and boot of processor 1105, such as from a power-on reset state. Additionally, in some embodiments boot device 1130 may include a secondary computer system configured to allow access to administrative functions such as debug or test modes of processor 1105.

Network 1140 may include any suitable devices, media and/or protocol for interconnecting computer systems, such as wired or wireless Ethernet, for example. In various embodiments, network 1140 may include local area networks (LANs), wide area networks (WANs), telecommunication networks, or other suitable types of networks. In some embodiments, computer system 1150 may be similar to or identical in configuration to illustrated system 1100, whereas in other embodiments, computer system 1150 may be substantially differently configured. For example, computer system 1150 may be a server system, a processor-based client system, a stateless "thin" client system, a mobile device, etc.

As used herein, "computer-readable storage medium" refers to a non-transitory (tangible) storage medium that is readable by a computer or computer system, and includes magnetic, optical, and solid-state storage media such as hard drives, optical disks, DVDs, volatile or nonvolatile RAM devices, holographic storage, programmable memory, etc. This term specifically does not include transitory (intangible) media (e.g., a carrier wave). The computer-readable storage medium may comprise different types of storage media as well or combinations thereof. In addition, the computer-readable storage medium may be located in a first computer in which the programs are executed, or may be located in a second different computer which connects to the first computer over a network, such as the Internet. In the latter instance, the second computer may provide program instructions to the first computer for execution. A computer-readable storage medium may include two or more computer-readable storage mediums which may reside in different locations, e.g., in different computers that are connected over a network. As an example, in one embodiment, a sending entity may contain a RAM device with stored instructions to perform method 900; and a receiving entity may contain a programmable memory with stored instructions to perform method 950.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    a destination device receiving a data stream from an origin, wherein the data stream includes a location value indicating a location in the data stream at which the origin has aborted communication of the data stream, wherein the location value is determined by the origin in response to an indication that transmission of the data stream is to be aborted;
    the destination device receiving a checkpoint value from the origin, wherein the checkpoint value corresponds to an amount of data between successive checkpoints in the data stream; and
    the destination device determining a remaining amount of data to be received from the data stream, wherein the determining is based at least in part on the location value and the checkpoint value.

2. The method of claim 1, wherein the data stream includes the checkpoint value, and wherein the location value is a single byte.

3. The method of claim 1, further comprising:
    the destination device determining the checkpoint value by dividing a length of the data stream by a partition number value, wherein the partition number value is equal to a number of desired checkpoints in the data stream.

4. The method of claim 3, wherein the partition number value is 256.

5. The method of claim 1, wherein determining the remaining amount of data to be received from the data stream includes:
    determining, using an API, that the data stream includes a location value; and
    retrieving the location value.

6. The method of claim 1, wherein determining the remaining amount of data to be received from the data stream includes:
    the destination device determining an amount of data that has been received from the data stream; and
    the destination device determining the remaining amount of the data stream to be received from the data stream based at least in part on the location value, the checkpoint value, and the amount of data that has been received.

7. The method of claim 1, further comprising:
    after determining the remaining amount of data from the data stream, the destination device using the location value to identify a beginning of a different data stream.

8. The method of claim 1, wherein the origin is a first software application executing on an origin device distinct from the destination device, wherein the data stream is received via a socket connection between the origin and a second software application executing on the destination device.

9. The method of claim 1, wherein the origin is a first software application executing on the destination device, and wherein the data stream is received via a software interface between the origin and a second software application executing on the destination device.

10. A non-transitory computer-readable storage medium having instructions stored thereon that are executable by a computing device to perform operations comprising:
    determining a checkpoint value for a data stream to be sent to a destination, wherein the checkpoint value corresponds to an amount of data between successive checkpoints in the data stream;
    sending the data stream to the destination, wherein the data stream includes the determined checkpoint value;
    receiving an indication that sending the data stream has been aborted;
    in response to the indication, determining a location value indicative of a location within the data stream at which sending of the data stream was aborted; and
    sending the location value to the destination, wherein the checkpoint value and the location value are usable by the destination to determine a remaining amount of the data stream to be received.

11. The computer-readable storage medium of claim 10, wherein the determining of the checkpoint value occurs at an application layer, and wherein the determining of the location value occurs at a lower-level layer relative to the application layer.

12. The computer-readable storage medium of claim 10, wherein the operations further comprise:
    determining an amount of data that has been sent from the data stream;
    determining a remaining amount of data to be sent from the data stream based at least in part on the checkpoint value, the location value, and the amount of data that has been sent; and
    sending the remaining amount of data.

13. The computer-readable storage medium of claim 12, wherein the operations further comprise:

in response to the sending of the remaining amount of data, sending a subsequent data stream, wherein the location value is indicative of a beginning of the subsequent data stream.

14. The computer-readable storage medium of claim 10, wherein in determining the location value, computing device performs operations further comprising:
   determining an amount of data in the data stream; and
   determining the location value based at least in part on the checkpoint value and the amount of data.

* * * * *

UNITED STATES PATENT AND TRADEMARK OFFICE
CERTIFICATE OF CORRECTION

PATENT NO. : 9,621,964 B2  Page 1 of 1
APPLICATION NO. : 13/632139
DATED : April 11, 2017
INVENTOR(S) : Mathur et al.

It is certified that error appears in the above-identified patent and that said Letters Patent is hereby corrected as shown below:

In the Specification

In Column 14, Line 10, delete "the it" and insert -- it --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*